3,340,136
BONDED FIBROUS PRODUCTS AND A METHOD
FOR PREPARING THEM
Joseph P. Burns and Frank Thomas Sanderson, Wilmington, Del., assignors to Atlas Chemical Industries, Inc., Wilmington, Del., a corporation of Delaware
No Drawing. Filed Mar. 9, 1962, Ser. No. 178,575
5 Claims. (Cl. 161—170)

This invention relates to bonded fibrous products and to a method for preparing bonded fibrous products. In particular this invention relates to fibrous material bonded by a polyester resin composition having a controlled vinyl monomer solubility rate and to a method of making the bonded fibrous material by employing polyester fibers as a binder resin.

Commercial polyester resins, particularly unsaturated polyester resins, are commonly used as binder resins for various types of fibers and fabrics which are used to reinforce resinous compositions. Unsaturated polyester resin compositions are usually prepared by reacting an unsaturated dibasic acid and a dihydric alcohol to form a resin. A great variety of polyester resin compositions with a wide range of properties can be prepared by varying the composition of the polyester resin. The properties of polyester resin compositions can also be altered by using materials in addition to unsaturated dibasic acids and dihydric alcohols in preparing the resins; e.g. saturated dibasic acids may be substituted for part of the unsaturated acid, or a polyhydric alcohol having more than two hydroxyl groups can be substituted for part of the dihydric alcohol if a more rigid polyester resin is desired.

Polyester resin compositions currently used as binder resins have different solubility rates in vinyl monomers which are generally present in resinous compositions which are to be reinforced with fibers bonded with the polyester resin. Of the numerous vinyl monomers which may be present in the resinous compositions, styrene is most generally used because of its availability and low cost.

Polyester resin compositions which have relatively fast solubility rates in vinyl monomers are used principally as binder resins in resinous compositions which are to undergo low pressure operations. In the low pressure operations, there is only a slight tendency for the fibrous material bonded by the polyester resin composition, such as cotton, glass, hemp and other natural and synthetic fibers, to be displaced, and therefore, it is permissible for the polyester binder resin composition to dissolve moderately rapidly in the vinyl monomer component of the resinous composition, for it is not necessary for the polyester binder resin to maintain the bonded fibers in a set position for a prolonged time. These polyester binder resins are preferred over polyester resins having relatively slow solubility rates for the low pressure operations, because they form bonded fibrous products which are more flexible and have better molding properties.

In high pressure operations, there is a great tendency for the material bonded by the polyester resin composition to be displaced. In this type of operation, it is essential that the polyester binder resin hold the fibrous material firmly in place, and therefore, the polyester resin should have a relatively slow solubility rate in the vinyl monomer component of the resinous composition.

It is evident that it would be desirable to be able to control the solubility rate of the polyester binder resin compositions in the vinyl monomer component of the resinous composition according to the operation which the reinforced resinous composition will undergo. It is very convenient to be able to formulate a polyester resin composition which has a vinyl monomer solubility rate particularly adapted to the operation to be performed on the reinforced resinous composition.

The binder resin art is also concerned about the problem of resin loss when the polyester binder resin is applied in powder form. It has been found that if the polyester resins are used in fiber form, the resin loss is greatly reduced. Accordingly, it is desirable to be able to prepare polyester resins of controlled solubility rate in vinyl monomers in fiber form and thereby reduce resin loss.

It is an object of this invention to provide a bonded fibrous product which is bonded with a polyester resin having a controlled vinyl monomer solubility rate.

Another object is to provide a bonded fibrous product which is bonded with polyester resin fibers which have a controlled vinyl monomer solubility rate.

A further object of the invention is to provide a method for producing a bonded fibrous product by employing polyester fibers as binder resins.

A still further object of the invention is to provide an improvement in a method for producing a polyester binder resin.

Other objects and purposes of this invention will be evident to those skilled in the art from the description which follows.

It has been discovered that a polyester resin which is prepared by reacting isophthalic acid, an unsaturated dicarboxylic acid, a dihydric alcohol and a polyhydric alcohol of from 3 to 6 hydroxyl groups has a high softening point and a vinyl monomer solubility rate which can be controlled by the amount of said polyhydric alcohol which is used to prepare the resin. These isophthalic polyesters, because of their high softening point and controlled vinyl monomer solubility rate, are very useful as binder resins for fibrous materials such as glass, glass wool, natural fibers, e.g. cellulose, silk, wool, cotton, etc., and synthetic fibers including polyamides, polyesters, polyolefins, vinyl polymers, etc. These isophthalic polyester resins are particularly useful in preparing bonded glass fibers which are used as reinforcing agents for resinous compositions.

Some of the polyester resins which are prepared from isophthalic acid, an unsaturated dicarboxylic acid, a dihydric alcohol and a polyhydric alcohol of from 3 to 6 hydroxyl groups have sufficient elasticity that they can readily be drawn into fibers. In preparing polyester resins which are to be drawn into fibers, one must be careful not to prepare a resin which is too brittle, for this may cause the fiber to break when it is being drawn. Brittleness may be caused by not having enough unreacted polyhydric alcohol of from 3 to 6 hydroxyl groups present in the resin, for unreacted polyhydric alcohol plasticizes the resin. On the other hand, if too much of the polyhydric alcohol reacts to form a highly crosslinked polyester resin, it may also be brittle and tend to be thermoset, though some crosslinking is desired for it improves the tensile strength of the resin. The elasticity of the resin can be controlled by the amount of polyhydric alcohol which is added and the time during the preparation of the resin at which the polyhydric alcohol is added. It should be noted also that in general lesser amounts of the polyhydric alcohols having more hydroxyl groups are required to obtain a certain degree of crosslinking.

Polyester resins prepared from isophthalic acid, an unsaturated dicarboxylic acid, a dihydric alcohol and a polyhydric alcohol of from 3 to 6 hydroxyl groups are very good binder resins, for they have a relatively high softening point, are relatively insoluble in vinyl monomers, and fibrous products which are bonded by them have good retention of tensile strength after folding. A further desirable property is that the binder resins prepared in accordance with this invention are compatible with impregnating resinous compositons.

The polyester binder resins used to prepare the bonded fibrous products of this invention may be prepared by conventional polyesterification techniques. The reactants employed in preparing the polyester resins comprise isophthalic acid, an unsaturated dicarboxylic acid, a dihydric alcohol and a polyhydric alcohol having from 3 to 6 hydroxyl groups. Examples of typical unsaturated dicarboxylic acids which may be used to prepare the polyester binder resins are maleic, fumaric, itaconic, chlormaleic, mesaconic and cis-3,6-endomethylene-tetrahydrophalic acids. In the resin art and in this specification and claims, the term "unsaturated dicarboxylic acids" is intended to exclude aromatic unsaturation. Also, the term dicarboxylic acids is meant to include such acids and their equivalents such as anhydrides, halides and esters, all of which can be used to prepare the polyester binder resins.

The dihydric alcohol portion of the polyester resins is generally supplied by a glycol, though any dihydric alcohol which produces an operative binder resin may be used. Some typical dihydric alcohols which are suitable are ethylene and propylene glycol, 1,3-propanediol, 1,3-, 1,4- and 2,3-butanediols, neopentyl glycol, isosorbide, polyoxyalkylene isosorbides having from about 2 to 6 oxyalkylene groups per molecule, hydrogenated bisphenol, polyoxyalkylene bisphenols having from about 2 to 6 oxyalkylene groups per molecule and 1,4-cyclohexanedimethanol. In addition, mixtures of dihydric alcohols may also be used, for example a mixture of propylene glycol and ethylene glycol. Diethylene and dipropylene glycols may also be used if they are admixed with one of the above-listed dihydric alcohols, but when used as the sole dihydric alcohol component, they form polyester resins which are liquids and which are not useful as binder resins.

It is preferred to use only a minor amount of a polyhydric alcohol having from 3 to 6 hydroxyl groups in preparing the polyester resins. They polyhydric alcohol helps to control the vinyl monomer solubility rate and it improves the ability of the polyester resin to form bonded fibrous mats which retain their tensile strength after folding. Typical of the polyhydric alcohols having from 3 to 6 hydroxyl groups which may be used to prepare the polyester binder resins are glycerol, trimethylol propane, erythritol, pentaerythritol, xylitol, sorbitol and mannitol. It is particularly preferred to use glycerol as the polyhydric alcohol reactant because of its availability and low cost, and because it yields very good polyester binder resins which are readily drawn into fibers. The polyhydric alcohol must be added carefully in order to avoid gelation, especially if the polyhydric alcohol has a functionality greater than three.

In the preparation of the polyester resins, the reactants may be reacted in various molar ratios, depending upon the desired polyester resin properties, which is a matter of operator's choice. In general, the molar ratio of carboxyl groups to hydroxyl groups will be equal to approximately one, but this is not essential.

Polyester resins having a controlled vinyl monomer solubility rate may be used as binder resins for fibrous products. In particular, this invention relates to using polyester resins which are relatively insoluble in vinyl monomers as binder resins. Polyester resins having a styrene test value (to be described later) of about 6 minutes or greater are usually regarded as relatively insoluble in vinyl monomers.

The amount of polyhydric alcohol of from 3 to 6 hydroxyl groups which is added to the polyester resin formulation will vary, depending upon the resin properties desired, the number of hydroxyl groups present in the polyhydric alcohol, and the time during the polyesterification reaction at which the polyhydric alcohol is added. In general, if the polyester resin formulation contains less than about 0.5 molar percent, based on the total moles of reactants, the resulting polyester resins are quite brittle as shown by low tensile strength and low fold tensile strength of fiber mats bonded by them. If more than about 10 molar percent of such polyhydric alcohol is present, it is likely that a highly crosslinked resin would be formed which would also be brittle. Therefore, it is generally preferred to incorporate from about 0.5 to about 10 molar percent of a polyhydric alcohol of from 3 to 6 hydroxyl groups, based on the total moles of reactants, into the polyester resin formulation, with from about 2 to about 5 molar percent being particularly preferred. The vinyl monomer solubility rate will usually decrease as the amount of said polyhydric alcohol is increased. As previously stated, a certain degree of crosslinking can be achieved using lesser amounts of polyhydric alcohol having more hydroxyl groups, and therefore lesser amounts of hexahydric alcohols will be required if used instead of glycerol.

The properties of the polyester binder resin are also affected by the time at which the polyhydric alcohol of from 3 to 6 hydroxyl groups is added to the polyesterification reaction mixture. In general, such polyhydric alcohols may be added to the reaction mixture when its acid number, after all of the isophthalic acid and dicarboxylic acid to be reacted have been added, ranges from about 25 to about 160. The acid number indicates the amount of unreacted acid still present in the reaction mixture, with the higher acid numbers indicating more unreacted acid. In general, addition of polyhydric alcohol at higher acid numbers will form a more crosslinked resin than if added at a lower acid number, provided the resulting resins have nearly equivalent acid numbers, for there is more acid available to react with the polyhydric alcohol. The number of polyhydric alcohol hydroxyl groups available to react with the unreacted acid has a similar effect. It has been found that if the polyhydric alcohol is added at lower acid values, the resulting polyester resin has greater elasticity which is probably caused by some unreacted polyhydric alcohol acting as a plasticizer and that there is not a highly crosslinked resin network.

A particularly preferred method for preparing the polyester binder resins is to react the desired amounts of isophthalic acid and dihydric alcohol to a low acid number. Then in a second stage reaction, add the unsaturated dicarboxylic acid and a small amount of dihydric alcohol, to make up the amount distilled off in the first stage reaction, to the first stage reaction mixture. Then the second stage of the reaction can be carried out. The polyhydric alcohol can be added to the reaction mixture during the second stage when the desired acid value for adding it is attained.

Recently, a modified two stage procedure for preparing isophthalic polyesters has been developed. This modified procedure is designed to shorten the polyesterification cycle without adversely affecting product quality. In a modified two stage process, the desired amounts of isophthalic acid and dihydric alcohol may be reacted until about 90% of the theoretical water of reaction has been removed from the reactor (the acid value of the reaction mixture would probably range from about 10 to about 20). Thereafter, the reactor temperature may be cooled to about 150° C., the desired amount of unsaturated dicarboxylic acid added, and the reaction continued at higher temperatures (about 235° C.) while collecting the water of reaction. The polyhydric alcohol may be added to the reaction mixture during the second stage when the desired acid value for adding it is attained. After the polyhydric alcohol is added, the reaction may be continued using the steam condensing apparatus for about one hour, after which the condenser may be removed and the reactor vented to the atmosphere. The reaction may be continued until the reaction mixture attains an acceptable acid value for the final polyester product. These two stage reaction procedures may be modified according to the desires of the operator.

It has also been discovered that if a vinyl monomer solubility rate less than the rate obtainable by incorporating a polyhydric alcohol in the polyester resin is desired, the incorporation of a curing agent such as benzoyl peroxide in powdered form into the isophthalic polyester resin, also in powered form, renders the resin practically insoluble in vinyl monomers. If benzoyl peroxide is used, concentrations up to about 1.5 percent by weight of the resin are generally effective for reducing the vinyl monomer solubility rate of the polyester resin. If a curing catalyst is added to the polyester resin, care should be exercised in making sure that the catalyst is thoroughly and uniformly mixed into the polyester resin.

In addition to the reactants already mentioned, other compounds may also be present in the reaction mixture during the polyesterification reaction. It is conventional to have one or more of the following materials in polyester reaction mixtures; polymerization inhibitors, polyesterification catalysts, light stabilizers, accelerators or promoters, fillers, and pigments or dyes.

In accordance with the invention, the polyester resins may be applied to fibers which are to be bonded in a variety of ways. The binder resin, in powdered form, may be poured or dusted onto a fiber mat; the resin may be deposited on a fiber mat by passing an emulsion or suspension containing powdered resin through the mat; polyester resins in fiber form may be mixed with the fibers to be bonded; and several other methods for contacting fibers with polyester binder resin are available.

After the resin is applied, the fiber mat may be heated so as to make the resin adhesive and then cooled, yielding a bonded fiber mat.

The bonded fiber mat may then be used as a reinforcing agent for resinous compositions. Reinforced resinous compositions may be molded or formed into numerous articles and shapes which may be heat cured to form reinforced plastic articles. Several types of resinous compositions are commonly employed in this type of application such as epoxy resins, phenolic resins and silicone resins, but the resinous compositions most extensively used are polyester resins in combination with vinyl monomers as crosslinking agents. Since vinyl monomers are good solvents for many types of polyester resins, it is important, especially in high pressure operations, that the polyester binder resin not be readily dissolved in the vinyl monomer of the resinous composition. Examples of vinyl monomers which are often combined with polyester resins to form resinuous compositions are styrene, vinyl toluene, alphamethyl styrene and mixtures thereof. Other vinyl monomers may also be used as crosslinking agents.

The preparation of the polyester binder resin is generally carried out in a stainless steel or glasslined reactor which is equipped with an agitator, an inert gas line to assist in removing water formed during the polyesterification and to exclude air, a condenser, and a heat source. The isophthalic acid, unsaturated dicarboxylic acid or acids, dihydric alcohol or alcohols and polyhydric alcohol having from 3 to 6 hydroxyl groups may be sequentially charged to the reactor, with the polyhydric alcohol being added after the other reactants have had a chance to react. It is generally preferred that the acid number of the polyesterificaton reaction mixture be reduced to about 160 or lower before adding the polyhydric alcohol. As previously stated, the polyesters are generally used in amounts sufficient to provide a carboxyl to hydroxyl molar ratio of approximately one, though the proportions of the reactants may be varied according to the operator's desire. In some instances it may be desired to use an excess of hydroxyl-containing material.

The reactants are heated slightly to initiate the reaction which is exothermic, especially when anhydrides are used. The polyesterification is carried out by maintaining the reactants at temperatures between about 180° C. and about 250° C. Higher temperatures are usually avoided because of the increased tendency for gelation to occur. Although not essential to the invention, it is generally preferred to continue the polyesterification until the polyester resin has an acid number of about 10 to 60. Any of the conventional polyesterification processes for preparing polyester resins, such as azeotropic distillation methods, fusion technique, etc., may be used to prepare the polyester binder resins.

At the process temperature, the finished polyester resin is a liquid which may be run into cooling pans, cooled and then powdered. In addition, the liquid resin may be run onto a drum flaker to form flakes, or it may be run into an extruder and drawn into fibers. In order to avoid gelation when preparing the polyester binder resin, a polymerization inhibitor such as hydroquinone or p-methoxyphenol may be incorporated in the polyesterification reaction mixture.

As previously indicated, it would be desirable to be able to prepare polyester binder resins in fiber form in order to reduce the resin loss associated with using the polyester resins in powder or flake form. It has been found that the isophthalic polyester resins which contain glycerol can be drawn into fibers. The hot polyester resin, which is a syrupy liquid, may be placed in a conventional fiber extruder and drawn into fibers. This fiber-forming property makes it possible to place polyester resin fibers with fibers which are to be bonded, such as glass or textile fibers, chop the mixed fibers into small strips, and then heat the chopped mixture to cause binding in a relatively easy, continuous operation.

The following examples illustrate the preparation of isophthalic polyester resins and their use as binder resins in the production of the bonded fibrous products of this invention:

Example I

A 3 liter round bottomed flask equipped with a stirrer, thermowell, $CO_2$ inlet and condensing column was charged with 608 grams (9.8 moles) of ethylene glycol. The glycol was warmed to about 75° C., and 996 grams (6 moles) of isophthalic acid were slowly added over 15–20 minutes. The reaction temperature was raised to about 210° C. for a 7 hour period, and polyesterification was carried out to an acid value of 5. The reactants were cooled to about 150° C., and a mixture of 392 grams (4 moles) of maleic anhydride and 0.2 grams of hydroquinone was added to the reactor. The reactor temperature was slowly raised to about 210° C. while 17 grams of ethylene glycol (corresponding to excess distillate weight) were added. The reaction was continued until an acid number of 65 was attained, at which time 46 grams (0.5 mole) of glycerol and 0.2 gram of hydroquinone were added. The polyesterification was continued at about 210° C. to a final polyester resin acid number of 15 and a softening point of 94° C.

The resin was poured from the reaction kettle, cooled, and ground to a 40 mesh powder. This polyester resin powder was used as a binder resin to prepare glass mats in the following manner:

A 14" x 14" perforated steel plate was placed in a mat-making machine to which a centrifugal blower was attached. A layer of 2 inch chopped glass fibers was sprinkled on the perforated steel plate, and a fog of water was sprayed over the glass with the blower on. The blower was switched off and 1 gram of the powdered resin was sprinkled uniformly over the mat. A second layer of glass was sprinkled on the first layer and then sprayed with water mist for 30 seconds with the blower on. This process was repeated 4 times, then the glass mat was removed and heated for 20 minutes in a 200° C. oven. The glass mat was cooled between 2 steel plates and was cut into sections for testing.

The vinyl monomer solubility rate was determined by suspending a 4 inch x 5 inch section of mat in a styrene bath at 25° C. A 100 gram clip was attached to the mat, and the length of time the mat would support the weight while suspended in the bath was measured as an indication of the resin solubility rate in styrene. A styrene test value of greater than 6 minutes is indicative of relative styrene insolubility.

The glass mats were also tested for their tensile strength and their retention of tensile strength after being folded. A 3 inch x 5 inch section of mat was mounted along the 5 inch dimension in the jaws of a tensile testing machine (a Tinius Olsen 30,000 pound capacity Electomatic Universal Testing Machine) with one inch of the sample clamped in each jaw of the tester, leaving a 3 inch x 3 inch area of the mat visible. The force necessary to tear the mat apart was recorded. Because of the difficulty in measuring mat thickness, the tensile strength is arbitrarily expressed in pounds per inch. The fold tensile strength was determined in a similar manner after a 3 inch x 5 inch sample had been folded 180° at the center line of the long dimension. The piece was then returned to its normal position and the tensile strength measured. The fold tensile retention is the ratio of fold tensile strength to the initial tensile strength expressed in percent and is a convenient indication of binder resin brittleness and mat handleability during subsequent mat operations.

Three 14 inch x 14 inch mats were prepared using each polyester resin to be evaluated as a binder resin. Two test pieces were cut from random sections of each mat for each of the three evaluations. Therefore, results reported for solubility rate, mat tensile strength and mat fold tensile strength are average values determined from 6 evaluations.

Mat properties for the polyester resin prepared in the manner described in this example were as follows:

Test of solubility rate (minutes) _____ over 10
Mat tensile strength (lbs./in.) _____ 23.2
Mat fold tensile strength (lbs./in.) _____ 16.2
Retention, percent _____ 70

These results indicate that this particular isophthalic polyester resin was relatively insoluble in styrene and produced bonded glass fiber mats having good tensile strength and good retention of tensile strength after folding.

*Example II*

The powdered isophthalic binder reisn of Example I was mixed with 1% by weight of benzoyl peroxide powder for 1 hour on a roller mill. Glass fiber mats were made in the manner described in Example I and the following test results were obtained:

Tests of solubility rate (hours) _____ over 15
Mat tensile strength (lbs./in.) _____ 24.5
Mat fold tensile strength (lbs./in.) _____ 16
Retention, percent _____ 65

These results indicate that the addition of a small amount of curing catalyst such as benzoyl peroxide increases the styrene resistance of the isophthalic polyester resin so that it may be regarded as practically insoluble in styrene.

*Example III*

The polyesterification reactants described in Example I, with the exception of glycerol, are charged together into a reactor. The reaction is carried out at about 210° C. until the reaction mixture attains an acid value of about 50–60, at which time the glycerol is added and the reaction is continued until the reaction mixture reaches an acid number of about 10–20. The resulting isophthalic polyester is a good binder resin with properties similar to those of the Example I resin.

*Example IV*

The molar ratios of the reactants and the polyesterification procedures were identical to those described in Example I, except that the glycerol was added immediately after the maleic anhydride had been charged and dissolved. The second portion of inhibitor was added 2 hours later, and the reaction was continued at 210° C. The resulting polyester resin had an acid value of 19 and a softening point of 93° C.

The product was ground to a 40 mesh powder and evaluated as a binder resin for glass fibers with the following results:

Test of solubility rate (minutes) _____ over 10
Mat tensile strength (lbs./in.) _____ 25.9
Mat fold tensile strength (lbs./in.) _____ 7.6
Retention, percent _____ 29.4

*Example V*

The molar ratios of reactants and reaction procedures were identical to those described in Examples I and IV. However, the glycerol was added to the reaction mixture at an acid number of about 104, and the second portion of inhibitor was added 2 hours later. Polyesterification was carried out at 210° C. and yielded a polyester resin having an acid number of 19 and a softening point of 95° C.

The polyester resin product was used to prepare glass mats by conventional procedures, and the resulting mats exhibited the following properties:

Test of solubility rate (minutes) _____ over 10
Mat tensile strength (lbs./in.) _____ 13.4
Mat fold tensile strength (lbs./in.) _____ 6.0
Retention, percent _____ 45.2

*Example VI*

Using the same molar ratios and procedures as in Examples I, IV and V, another polyester resin was prepared. In this example, the glycerol and additional inhibitor were added at an acid number of 64. The reaction was continued at 210° C. The polyester resin product had an acid number of about 19 and a softening point of 93° C.

The polyester resin was used as a binder for glass mats and the following mat properties were determined:

Test of solubility rate (minutes) _____ over 10
Mat tensile strength (lbs./in.) _____ 15.3
Mat fold tensile strength (lbs./in.) _____ 10.5
Retention, percent _____ 68.4

*Example VII*

Molar ratios of reactants and reaction procedures were identical to those described in Examples I, IV, V and VI except as to the time of glycerol addition. In this experiment the glycerol and additional inhibitor were added at an acid number of 49, and thereafter, the polyesterification was continued at 210° C. The resulting polyester resin had an acid number of 22 and a softening point of 83° C. The resin was ground and screened to a 40 mesh powder and then used as a glass mat binder with the following results:

Test of solubility rate (minutes) _____ over 10
Mat tensile strength (lbs./in.) _____ 23
Mat fold tensile strength (lbs./in.) _____ 17.6
Retention, percent _____ 76.5

The results of Examples I, IV, V, VI and VII indicate that the addition of glycerol to the polyesterification reaction mixture at an acid number in the range of 50 to 160 did not appreciably affect the mat solubility rate, i.e. the vinyl monomer solubility rate of the polyester resin. However, when the glycerol was added at the lower acid numbers, mats prepared from the resulting resins have greater retention of tensile strength after being folded.

*Example VIII*

The polyesterification was carried out in a manner identical to that of Example I, but with the following molar ratios:

| | Moles |
|---|---|
| Isophthalic acid | 3 |
| Maleic anhydride | 2 |
| Ethylene glycol | 4.75 |
| Glycerol | 0.4 |

The final polyester resin had an acid number of 18 and a softening point of 93° C. This resin was tested as a binder resin for glass fibers with the following results:

Test of solubility rate (minutes) _____ over 10
Mat tensile strength (lbs./in.) _____ 18
Mat fold tensile strength (lbs./in.) _____ 13
Retention, percent _____ 70

Example IX

The isophthalic polyester resin described in Example I was drawn into fiber using a conventional extruding technique. The polyester resin was heated to a liquid state and poured into an extruder. At the bottom of the extruder, the perforated plate through which the polyester resin was drawn into fibers was maintained at temperatures ranging from about 113–126° C. during the extrusion process. The pressure in the extruder was maintained at about 10 pounds per square inch. The extrusion was carried on for 10 minutes during which there were no breaks in the fibers being drawn and 280 grams of fibers were drawn. The polyester fibers had a diameter of about 2.64 mils.

These isophthalic polyester fibers were mixed with glass fibers, and the mixed fibers were chopped into small strips. This chopped fiber mixture was then heated to about 200° C. to cause binding of the glass fibers into a mat.

Example X

A polyester resin similar in composition to the resin of Example I was prepared in the manner described in Example I, except that pentaerythritol was substituted for the glycerol. The following molar ratios were used:

| | Moles |
|---|---|
| Isophthalic acid | 3 |
| Maleic anhydride | 2 |
| Ethylene glycol | 4.8 |
| Pentaerythritol | 0.24 |

The resulting resin had an acid number of 38 and a softening point of about 112° C. When used as a binder resin, these results were obtained:

Test of solubility rate (minutes) _____ over 10
Mat tensile strength (lbs./in.) _____ 20.98
Mat fold tensile strength (lbs./in.) _____ 9.61
Retention, percent _____ 46

Having completely described this invention, what is claimed is:

1. A fibrous mat comprising fibrous material bound together by a minor amount of a polyester binder resin which is substantially no more than sufficient to bind said fibrous material together, said mat being suitable for loading with a molding resin for the production of reinforced plastic material, said binder resin being the reaction product of isophthalic acid, an unsaturated dicarboxylic acid, a dihydric alcohol and from about 0.5 to about 10 molar percent of a polyhydric alcohol of from 3 to 6 hydroxyl groups, reacted in amounts such that the molar ratio of carboxyl groups to hydroxyl groups is equal to about one.

2. A fibrous mat comprising fibrous material bound together by a minor amount of a polyester binder resin which is substantially no more than sufficient to bind said fibrous material together, said mat being suitable for loading with a molding resin for the production of reinforced plastic material, said binder resin being the reaction product of isophthalic acid, an unsaturated dicarboxylic acid, a dihydric alcohol selected from the group consisting of ethylene glycol, propylene glycol, 1,3-propanediol, 1,3-butanediol, 2,3-butanediol, 1,4-butanediol, neopentyl glycol, isosorbide, polyoxyalkylene isosorbides having from about 2 to 6 oxyalkylene groups per molecule, hydrogenated bisphenol, polyoxyalkylene bisphenols having from about 2 to 6 oxyalkylene groups per molecule and 1,4-cyclohexanedimethanol, and from about 0.5 to about 10 molar percent of a polyhydric alcohol of from 3 to 6 hydroxyl groups, reacted in amounts such that the molar ratio of carboxyl groups to hydroxyl groups is equal to about one.

3. A product made in accordance with claim 2 in which the fibrous material is glass.

4. A product made in accordance with claim 2 in which the polyhydric alcohol of from 3 to 6 hydroxyl groups is glycerol.

5. A bonded fibrous mat made in accordance with claim 2 in which the unsaturated dicarboxylic acid reactant is selected from the group consisting of maleic anhydride and fumaric acid, the dihydric alcohol is ethylene glycol and the polyhydric alcohol is glycerol.

References Cited

UNITED STATES PATENTS

| | | | |
|---|---|---|---|
| 2,430,868 | 11/1947 | Francis | 264—115 |
| 2,758,951 | 8/1956 | Case | 154—43 |
| 2,904,533 | 9/1959 | Carlston et al. | 260—75 |
| 3,025,266 | 3/1962 | Huffman | 260—75 |
| 3,047,539 | 7/1962 | Pengilly | 260—75 |
| 3,063,883 | 11/1962 | Brissette | 154—43 |
| 3,160,679 | 12/1964 | Lew | 260—75 |
| 3,196,131 | 7/1965 | Mayer | 161—195 |

OTHER REFERENCES

Lawrence: "Polyester Resins" (1960), published by Reinhold Pub. Corp. (N.Y.), pp. 23 and 24.

ALEXANDER WYMAN, *Primary Examiner.*

EARL M. BERGERT, *Examiner.*

H. L. GATEWOOD, W. J. VANBALEN,
*Assistant Examiners.*